United States Patent
Kanechika et al.

(10) Patent No.: US 7,081,425 B2
(45) Date of Patent: Jul. 25, 2006

(54) ALUMINUM NITRIDE SINTERED BODY

(75) Inventors: Yukihiro Kanechika, Shunan (JP); Hideki Sato, Shunan (JP); Masanobu Azuma, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 48 days.

(21) Appl. No.: 10/948,211

(22) Filed: Sep. 24, 2004

(65) Prior Publication Data

US 2005/0070421 A1 Mar. 31, 2005

(30) Foreign Application Priority Data

Sep. 25, 2003 (JP) .............................. 2003-334032

(51) Int. Cl.
*C04B 35/581* (2006.01)
(52) U.S. Cl. ..................................... 501/98.4
(58) Field of Classification Search ................. 501/98.4
See application file for complete search history.

(56) References Cited

U.S. PATENT DOCUMENTS 6,048,813 A * 4/2000 Hunter ........................ 501/86
6,486,085 B1 * 11/2002 Katsuda et al. ............ 501/98.4

* cited by examiner

*Primary Examiner*—Karl Group
(74) *Attorney, Agent, or Firm*—Sherman & Associates

(57) ABSTRACT

An aluminum nitride sintered body having an oxygen concentration of not larger than 400 ppm, a metal impurity concentration of not larger than 150 ppm, and a carbon concentration of not larger than 200 ppm, and having an average crystal grain size of 2 μm to 20 μm. The sintered body exhibits particularly excellent optical properties such as an inclination of a spectral curve in the wavelength region of 260 to 300 nm of not smaller than 1.0 (%/nm), a light transmission factor of not smaller than 86% in the wavelength region of 400 to 800 nm, and a wavelength of not longer than 400 nm when the light transmission factor reaches 60% in the spectrum.

3 Claims, No Drawings

ALUMINUM NITRIDE SINTERED BODY

BACKGROUND OF THE INVENTION

1. Field of the Invention

The present invention relates to a novel aluminum nitride sintered body. More specifically, the invention relates to an aluminum nitride sintered body having very excellent light transmission properties and can be particularly preferably used as a light-transmitting cover for a source of light having a high light-emitting efficiency.

2. Description of the Related Art

As light-transmitting materials, there have heretofore been used a transparent resin, a glass, a quartz and a translucent alumina which permits the transmission of visible light, depending upon the environment in which it is used and the cost. For instance, there has been used a transparent resin or a glass as a cover (window material) for a source of light having a low energy intensity and as a light-transmitting material for permitting the transmission of light of wavelengths containing relatively little ultraviolet rays. Further, a material containing quartz or alumina has been used as a light-transmitting cover for a source of light that contains relatively large amounts of ultraviolet rays or for a source of light that has a large energy intensity and becomes high in temperature when it is used. There is further used an alumina material having a high resistance against corrosion as a light-transmitting cover for a source of light that uses a corrosive gas such as a halogen gas.

In recent years, further, the sources of light have been so improved as to feature a higher light-emitting efficiency, and there has now been known, for example, a source of light containing, as a light-emitting material, a halide (and, particularly, an iodide and a bromide) of metals such as Na, Sc, Sn, Th, Tl, In, Li, Tm, Ho and Dy. However, an increase in the brightness of the source of light is accompanied by an increase in the amount of heat that generates. Therefore, the source of light having a high light-emitting efficiency is accompanied by a problem related to a material forming the light-transmitting member such as a cover adapted thereto. That is, the alumina material has a resistance against the halogen gas which, however, is not still satisfactory. Besides, the alumina material has a thermal conductivity of as small as 30 W/mK. Therefore, heat of the source of light is not radiated to a sufficient degree and it is considered that the life of the source of light is shortened.

In order to solve the above problem, Japanese Unexamined Patent Publication (Kokai) No. 2-26871 proposes an aluminum nitride having a good heat resistance, a thermal conductivity and a mechanical strength as a light-transmitting window material which permits the transmission of infrared rays and radar beams. According to the above publication, an AlN sintered body having a light transmission factor of 75% over a wavelength region of 0.2 µm to 30 µm is obtained by firing a starting material having a specified particle diameter of the starting material powder, a specified content of the metal impurities and a specified oxygen content in an inert gas atmosphere at 1700 to 2100° C.

Further, Japanese Unexamined Patent Publication (Kokai) No. 60-193254 discloses a light-emitting tube provided with a light-transmitting cover (hollow tube) made of an aluminum nitride sintered body obtained by using a starting aluminum nitride powder having a particle size distribution in which not less than 70% of the particles have sizes of 0.3D to 1.8D (D: average particle size). Examples of this publication discloses an aluminum nitride sintered body having a total light transmission factor of 84%.

According to the above known technology, it is surely possible to produce an AlN sintered body having improved light transmission property. As for the light transmission factor, however, there still remains room for improvement. That is, when the aluminum nitride sintered body is used as a light-transmitting cover for the source of light having a high light-emitting efficiency described above, it is desired that the light transmission factor in a visible range of 400 nm to 800 nm is not smaller than 85% when the reflection factor is taken into consideration. However, the transmission factor (400 nm to 800 nm) of the aluminum nitride sintered body obtained by the above known technology is 85% at the greatest.

As for the light transmission property in the ultraviolet ray region, further, the conventional light-transmitting aluminum nitride sintered body has room for improvement concerning the rising light transmission factor. The rising light transmission factor is important for realizing a high light transmission factor over a wide wavelength range of from an ultraviolet region to an infrared region in the use as a light-transmitting cover.

SUMMARY OF THE INVENTION

It is, therefore, an object of the present invention to provide an aluminum nitride sintered body which exhibits a light transmission factor of as very high as to reach 86% or more in the visible region, which effectively radiates the light of the source of light even when it is used as a light-transmitting cover for a source of light having a high light-emitting efficiency and a high brightness, and which effectively prevents the life of the source of light from being shortened by the generation of heat.

Another object of the present invention is to provide an aluminum nitride which exhibits very excellently rising transmission factor in the ultraviolet ray region and a high light transmission factor over a wide range of wavelengths, and a method of producing the same.

In view of the above problems, the present inventors have conducted keen study, have discovered the fact that the aluminum nitride sintered body obtained by firing an aluminum nitride powder by using a sintering additive having a large specific surface area contains oxygen, sintering additive, metal impurities stemming from unavoidable metals, and carbon at concentrations which are very decreased as compared to those of the conventional aluminum nitride sintered bodies, exhibits a very excellent rising transmission factor in the ultraviolet ray region, and exhibits a transmission factor which is as high as to reach 86% or more even in the visible region, and have thus finished the invention.

Namely, according to the present invention, there is provided an aluminum nitride sintered body having an oxygen concentration of not larger than 400 ppm, a metal impurity concentration of not larger than 150 ppm, and a carbon concentration of not larger than 200 ppm, and having an average crystal grain size of 2 µm to 20 µm.

It is desired that the above aluminum nitride sintered body:

(1) Has an inclination of a spectral curve in the wavelength region of 260 to 300 nm of not smaller than 1.0 (%/nm), a light transmission factor of not smaller than 86% in the wavelength region of 400 to 800 nm, and a wavelength of not longer than 400 nm when the light transmission factor reaches 60% in the spectrum; and (2) Has mechanical properties such as a flexural strength of not smaller than 300 MPa.

According to the present invention, further, there is provided a method of producing an aluminum nitride sintered body comprising a step of firing a mixture of an aluminum nitride powder and a sintering additive having a BET specific surface area of 20 to 50 m²/g in a reducing atmosphere.

In the above method of production, it is desired that:

(3) The sintering additive is used in an amount of 0.5 to 4 parts by weight per 100 parts by weight of the aluminum nitride powder; and (4) A plurality of kinds of sintering additives are used.

The present invention provides an aluminum nitride sintered body having an excellently rising light transmission factor that could not be achieved so far and exhibiting a very high transmission property for the visible light.

Further, the aluminum nitride sintered body having the above-mentioned properties is particularly useful as a light-transmitting cover such as a light-transmitting tube. Owing to its high thermal conductivity and a high resistance against chemical corrosion as possessed by the conventional aluminum nitride sintered body, as well as owing to its optical properties as described above, the aluminum nitride sintered body of the present invention makes it possible to lengthen the life of the source of light even when it is used for a light-emitting tube that uses a highly bright source of light.

When the aluminum nitride sintered body is used for a light-transmitting cover such as an ultraviolet ray transmission window, it is made possible to realize a high ultraviolet ray transmission factor owing to the above-mentioned optical properties.

DETAILED DESCRIPTION OF THE INVENTION (Aluminum Nitride Sintered Body)

The aluminum nitride sintered body of the present invention has an important feature in that the impurity concentrations (concentrations of components other than Al and N) are suppressed to lie in a very low range. Concretely, the oxygen concentration is suppressed to be not higher than 400 ppm and, particularly, not higher than 300 ppm, the metal impurity concentration is suppressed to be not higher than 150 ppm and, particularly, not higher than 85 ppm, and the carbon concentration is suppressed to be not higher than 200 ppm. Here, the metal impurity concentration stands for a metal concentration of other than Al, i.e., stands for a total concentration of metals stemming from the sintering additives and other metals (e.g., metals in the starting powder stemming from unavoidable impurities).

Namely, in the present invention, the aluminum nitride is fired by using a sintering additive having a particular specific surface area that will be described later, whereby the impurity concentration is markedly lowered as compared to the conventional aluminum nitride sintered bodies. As a result, the aluminum nitride sintered body exhibits excellent optical properties as demonstrated in Examples appearing later. For example, the aluminum nitride sintered body of the present invention having the impurity concentrations suppressed to lie within the above-mentioned ranges exhibits an inclination of a spectral curve of not smaller than 1.0 (%/nm) and, particularly, not smaller than 1.3 (%/nm) in a wavelength region of 260 to 300 nm, exhibits excellently rising properties in the ultraviolet ray region, exhibits a light transmission factor of not lower than 86% in the wavelength region of 400 to 800 nm, permits the light transmission factor in the spectrum to reach 60% in the wavelength of not longer than 400 nm and, particularly, not longer than 320 nm, and exhibits a high light transmission factor over a wide range of wavelengths of from the ultraviolet region to the infrared region. An aluminum nitride sintered body has heretofore been produced by firing without using sintering additive in order to avoid a drop in the light transmission caused by an increase in the contents of impurities. Even when the sintering additive is used, the sintering additive has a small specific surface area from the standpoint of handling. Therefore, the impurity concentrations are not suppressed to lie within the above ranges, and the above-mentioned optical properties are not obtained.

It is further important that the aluminum nitride sintered body of the present invention has an average crystal grain size in a range of 2 to 20 μm and, particularly, 5 to 15 μm. Namely, when the average crystal grain size is smaller than 2 μm, the aluminum nitride sintered body permits light to pass through less. When the average crystal grain size exceeds 20 μm, on the other hand, the aluminum nitride sintered body exhibits a markedly decreased strength and fails to provide a practicable strength when it is used as a light-transmitting cover. Since the aluminum nitride has an average crystal grain size that lies within the above range, the sintered body of the present invention exhibits excellent optical properties as well as a high strength, such as a flexural strength of not smaller than 300 MPz as described above.

(Production of Aluminum Nitride)

The aluminum nitride sintered body of the invention is produced by molding a mixture of an aluminum nitride powder and a particular sintering additive into a predetermined shape, and firing the molded article in a reducing atmosphere.

<Aluminum Nitride Powder>

The aluminum nitride powder used as a starting material has a particle size which, through the firing, makes it possible to achieve the crystal grain size lying in the above-mentioned range. Usually, by taking the particle growth during the firing into consideration, there is used an aluminum nitride powder preferably having an average particle size slightly smaller than the above crystal grain size. For instance, there is preferably used an aluminum nitride powder having an average particle size of 0.5 to 15 μm and, desirably, 1 to 10 μm.

In order to suppress the impurity concentrations in the sintered body to lie within the above-mentioned ranges of low concentrations, the aluminum nitride powder that is used has a high purity of not lower than 97% by weight and, desirably, not lower than 99% by weight and, most desirably, has a metal impurity concentration (concentration of metals other than Al) of not higher than 50 ppm, and an oxygen concentration of not higher than 1% by weight and, particularly, not higher than 0.8% by weight.

In the present invention, further, it is allowable to use an aluminum nitride powder containing carbon as an impurity component to lower, particularly, the oxygen concentration in the sintered body. Namely, upon conducting the firing in the presence of carbon, oxygen contained as impurity reacts with carbon and is removed as a carbonic acid gas. However, if contained in large amounts in the starting powder, carbon remains in the sintered body as impurities making it difficult to suppress the concentration of carbon in the sintered body to lie within the above-mentioned range. It is, therefore, desired that the carbon concentration in the aluminum nitride powder is not higher than 450 ppm.

<Sintering Additives>

The present invention uses a sintering additive together with the aluminum nitride powder. Here, it is essential that the sintering additive has a BET specific surface area of 20 to 50 m$^2$/g and, particular, 25 to 50 m$^2$/g from the standpoint of suppressing the impurity concentrations in the sintered body to lie within the above-mentioned ranges to obtain excellent optical properties.

The sintering additive is used for forming a liquid phase during the firing thereby to enhance the sintering property. The sintering additive that has heretofore been used for the aluminum nitride has a specific surface area lower than the above range. The sintering additive having a large specific surface area as described above exhibits a very large effect for enhancing the sintering property but easily adsorbs moisture and tends to be aggregated, making it difficult to improve the sintering property as desired and without at all offering advantage to meet the use. On the other hand, when a sintering additive having a specific surface area smaller than the above range is used, the sintering additive must be used in a considerably large amount to obtain a desired sintering property. As a result, the impurity concentration becomes very high in the obtained sintered body and, particularly, the concentrations of metal impurities stemming from the sintering additive become high and the oxygen concentration increases. Besides, firing must be conducted at a high temperature for extended periods of time causing an increase in the crystal grain size. Consequently, transmission of light decreases. Therefore, no sintering additive has been used for the production of the aluminum nitride sintered body that features a high light transmission. Accordingly, the aluminum nitride sintered body having the above-mentioned excellent optical properties was not obtained; i.e., the light transmission factor of 85% was an upper limit in the wavelength region of, for example, 400 to 800 nm (see Japanese Unexamined Patent Publication (Kokai) No. 2-26871 mentioned earlier), and the aluminum nitride sintered body exhibiting a higher light transmission factor was not obtained.

According to the present invention which uses a sintering additive having a relatively large specific surface area lying in the above-mentioned range, on the other hand, it becomes possible to obtain an aluminum nitride sintered body having excellent optical properties and strength as described above. That is, the sintering additive having a large specific surface area forms a liquid phase nearly entirely and quickly when it is heated at a firing temperature contributing to promoting the sintering. The assistant that has contributed to promoting the sintering volatilizes accompanying the progress of the sintering. Therefore, the sintering additive that is used in small amounts exhibits a large effect for promoting the sintering, and does not almost remain in the sintered body. Besides, impurities contained in the starting powder are taken in the liquid phase, and volatilize together with the assistant accompanying the progress of the sintering. As a result, the concentrations of metal impurities and the concentration of oxygen in the obtained sintered body are lowered to lie within the above-mentioned ranges, and the sintered body exhibits very excellent optical properties such as light transmission property, etc. Reference should be made, for example, to Example 3 and Comparative Example 2 appearing later. Example 3 and Comparative Example 2 are producing aluminum nitride sintered bodies by conducting firing under quite the same conditions but using sintering additives (yttria) having different specific surface areas. In Example 3 using a sintering additive having a BET specific surface area of 35 m$^2$/g in compliance with the present invention, the obtained aluminum nitride contains metal impurities and oxygen at very decreased concentrations, and exhibits very excellent optical properties (e.g., light transmission factor of 86%) as described above. In Comparative Example 2 using a sintering additive having a BET specific surface area (12 m$^2$/g) smaller than that of the present invention, on the other hand, the concentrations of metal impurities and the concentration of oxygen in the obtained sintered body are higher than those of Example 3 by hundreds to thousands of times. Therefore, the optical properties are very poor. For example, the light transmission factor is 68%.

When a sintering additive having a specific surface area larger than the above range is used in the present invention, the aggregation readily occurs after the use, the sintering is not promoted to a large extent and, hence, the aluminum nitride sintered body having desired excellent optical properties and strength is not obtained.

There is no particular limitation on the particle size so far as the sintering additive used in the present invention has a large specific surface area as described above. In general, however, the liquid phase can be easily formed as the particle size decreases. It is, therefore, desired that the sintering additive has a particle size of not larger than 5 µm and, particularly, 0.05 to 3 µm.

Here, as described earlier, the sintering additive having a high specific surface area tends to be easily aggregated and, particularly, adsorbs moisture to easily form an aggregate. When the sintering additive is used in the form of an aggregate, the above-mentioned excellent sintering promoting effect decreases, and a sintered body having excellent optical properties is not obtained. It is therefore desired that the sintering additive used in the present invention is preserved in, for example, the dry air and, depending upon the cases, is dried by heating in vacuum just before being placed in use.

The kinds of the sintering additives may be the known ones, i.e., alkaline earth oxides such as CaO and SrO, and rare earth oxides such as $Y_2O_3$, $CeO_2$, $Ho_2O_3$, $Yb_2O_3$, $Gd_2O_3$, $Nb_2O_3$, $Sm_2O_3$ and $Dy_2O_3$. However, yttrium oxide ($Y_2O_3$) is most widely used. The sintering additive needs not necessarily be an oxide but may be a carbonate, a nitrate or a phosphate.

In the present invention, the sintering additive can be used in one kind alone. More preferably, however, the sintering additives are used in a combination of a plurality of kinds from the standpoint of promoting the formation of the liquid phase by firing by lowering the melting point, promoting the volatilization of assistants, and further lowering the concentrations of impurities, in order to further improve optical properties of the sintered body. In the combination of the assistants, it is desired that the one assistant (hereinafter called main assistant) and other assistant to be used in combination (hereinafter called sub-assistant) are used at a weight ratio (sub-assistant/main assistant) of 0.01 to 0.5 and, particularly, 0.05 to 0.3. There may be used one kind, two kinds or more kinds of sub-assistants. When the sub-assistants are used in two or more kinds, it is desired that the total amount thereof is satisfying the above weight ratio. It is, further, desired that the melting point of the sub-assistant is lower than melting point of the main assistant (as for the one that forms an oxide by decomposition by heating such as a carbonate, the melting point may be compared as the oxide).

It is desired that the above-mentioned firing assistants are used in an amount of, usually, 0.1 to 4 parts by weight and, particularly, 1 to 3.5 parts by weight per 100 parts by weight of the aluminum nitride powder from the standpoint of suppressing the concentrations of impurities within the above-mentioned ranges and obtaining an aluminum nitride sintered body having excellent optical properties such as light transmission.

<Mixing>

The aluminum nitride powder and the sintering additive powder can be mixed together by a known method. For example, there can be desirably employed a dry- or wet-type mixing method by using a mixer such as a ball mill. The wet-type mixing uses a dispersant such as alcohols or hydrocarbons. From the standpoint of dispersion property, use is preferably made of alcohols or hydrocarbons.

As described above, the sintering additive is preserved in the dry air so will not to adsorb moisture or so will not to be aggregated. As required, the powder of the sintering additive dried in vacuum and is readily mixed with the aluminum nitride powder.

<Molding>

Prior to the firing, the above mixed powder is molded into a predetermined shape to meet the use. The molding can be effected by any known means. To obtain a molded article having a large strength maintaining a good yield, it is desired that the molding is effected by using an organic binder.

For example, the above mixed powder is, mixed with the organic binder resin, and, as required, is added to a dispersant, a plasticizer or a solvent to prepare a slurry or a paste for molding, and the slurry or the paste for molding is molded by such molding means as a doctor blade method, an extrusion-molding method, injection molding method or casting molding method to obtain a molded article. As the organic binder, there can be used a butyral resin such as polyvinyl butyral or an acrylic resin such as polymethacryl butyl. The above organic binder can be used in an amount of 0.1 to 30 parts by weight and, particularly, 1 to 15 parts by weight per 100 parts by weight of the aluminum nitride powder. As the dispersant, there can be exemplified glycerin compounds. As the plasticizer, there can be exemplified phthalic acid esters. As the solvent, there can be used an isopropyl alcohol or hydrocarbons.

The molding can be further effected by a compression-molding method without using organic binder. For example, a mixed powder of the aluminum nitride powder and the sintering additive powder is false-molded by using a mono-axial molding machine, and is press-molded by using a CIP (cold isostatic press) molding machine under a pressure of 1 to 4 t/cm$^2$ to obtain a molded article.

<Firing>

The obtained molded article is subjected to the firing after dewaxed (removing the binder).

The dewaxing can be effected by heating in any atmosphere such as in the air, nitrogen or gas. In the present invention, in particular, it is desired to effect the dewaxing in nitrogen where the amount of residual carbon can be easily adjusted to limit the amount (content) of residual carbon after dewaxed to lie within a particular range as will be described later. The dewaxing temperature varies depending upon the kind of the organic binder but is, usually, 300 to 900° C. and, particularly, 300 to 700° C. When the molding is effected without using the organic binder as in the compression-molding method, the dewaxing step is not necessary.

In the present invention, the firing is conducted in a reducing atmosphere to effectively remove the sintering additives and to lower the concentrations of metal impurities and the concentration of oxygen in the sintered body.

As a method of realizing the reducing atmosphere, there can be exemplified a method of placing a source of generating carbon together with the molded article in a vessel for firing or a method of using a vessel made of carbon for firing. Between them, it is desired to employ a method of placing the source of generating carbon together with the molded article in the vessel for firing from the standpoint of thermal conductivity and color shading of the obtained sintered body. In order to obtain a high thermal conductivity, in particular, it is most desired to employ a method of using a sealed vessel for firing and placing the molded article and the source of generating carbon in the sealed vessel.

There is no particular limitation on the source of generating carbon; i.e., there can be used carbon of any known form such as amorphous carbon or graphite, and solid carbon is preferred. There is no particular limitation on the shape carbon; i.e., carbon may be in the form of a powder, a fiber, a felt, a sheet or a plate, or may be a combination thereof. Among them, plate-like amorphous carbon or graphite is preferred from the standpoint of obtaining a high thermal conductivity.

There is no particular limitation on the method of containing the molded article and carbon in the vessel. Besides, carbon and the molded article may be contained in either a non-contacting manner or a contacting manner. Between them, the non-contacting manner is desired from the standpoint of easily controlling the thermal conductivity of the obtained sintered body. Further, the non-contacting manner may be in any known form. There can be exemplified a method of simply providing a gap between carbon and the molded article, a method of interposing a powder of boron nitride or the like between the carbon and the molded article to maintain a non-contacting state, or a method of maintaining a non-contacting state by placing a ceramic plate of aluminum nitride or boron nitride between the carbon and the molded article. From the standpoint of improving the thermal conductivity, however, it is desired to employ a method of maintaining a non-contacting state by placing a plate between the carbon and the molded article. In particular, it is desired to employ a method of placing a plate so as to shut off a space where carbon is contained from a space where the molded article is contained as much as possible in the sealed vessel, in order to obtain an aluminum nitride sintered body having a higher thermal conductivity.

The firing is conducted in the reducing atmosphere desirably at a temperature of 1500 to 2000° C. for at least 3 hours and, particularly, for at least 10 hours. If the firing is conducted for extended periods of time, the crystal grains of the aluminum nitride sintered body grow and, besides, the carbon concentration increases in the sintered body. It is therefore desired that the firing is conducted in the reducing atmosphere for a period of time not longer than 200 hours, particularly, not longer than 100 hours and, most particularly, not longer than 50 hours.

In the present invention, further, it is desired to conduct the firing in a neutralizing atmosphere in combination with the firing conducted in the reducing atmosphere in order to reliably lower the carbon concentration in the sintered body to lie within the above-mentioned range. For example, it is desired to employ an embodiment of conducting the firing in a reducing atmosphere after the firing in a neutralizing atmosphere, or an embodiment of conducting the firing in a neutralizing atmosphere, conducting the firing in a reducing atmosphere and, further, conducting the firing in the neutralizing atmosphere. That is, if the firing is conducted in the reducing atmosphere for an extended period of time, the concentrations of metal impurities are suppressed to lie within the above-mentioned ranges but the carbon concentration increases spoiling, after all, the optical properties of the sintered body. Therefore, the firing time in the reducing atmosphere is limited to lie in the above range and the firing is conducted to a suitable degree in the neutralizing atmosphere to obtain a densely and highly strongly sintered body.

The neutralizing atmosphere stands for a state where oxygen $O_2$ and carbon C are not substantially existing in the atmosphere and, concretely, stands for an inert gas atmosphere such as of nitrogen or argon. The firing in the neutralizing atmosphere is conducted by substituting, for example, the interior of a closed vessel by an inert gas. As the closed vessel, there is preferably used a vessel made of ceramics such as aluminum nitride or boron nitride, or made of a non-carbon material such as tungsten W or molybdenum Mo, and, particularly, a vessel made of ceramics such as aluminum nitride or boron nitride from the standpoint of durability. There can be further used a carbonaceous vessel of which the inner surface is coated with a non-carbonaceous material which does not permit the passage of gases. In effect, the firing may be conducted in a state where no carbon source is existing except carbon remaining in the molded article in space in the closed vessel.

It is desired that the firing is conducted in the neutralizing atmosphere at a temperature of 1500 to 1900° C. for a period of time which is, usually, 3 to 100 hours and, particularly, 30 to 50 hours though it may vary depending upon the firing time conducted in the reducing atmosphere.

The thus obtained aluminum nitride sintered body of the present invention can be used being molded in a variety of shapes such as tubes, plates, curved surfaces, balls, elliptic balls, cups and the like depending upon the structures in the use such as light-transmitting covers and the like.

EXAMPLES

In the following Examples and Comparative Examples, a variety of properties were measured according to the following methods.

(1) Concentrations of Impurities.

The concentrations of metal impurities (concentrations of metal elements) were determined by pulverizing the aluminum nitride sintered body into a powder, alkali-fusing the powder, followed by the neutralization with an acid, and analyzing the ICP light emission of the solution by using an instrument, ICP-1000, manufactured by Shimazu Seisakusho Co.

The carbon concentration was determined from the amounts of CO and $CO_2$ gases by pulverizing the aluminum nitride sintered body into a powder and by burning the powder in an oxygen stream by using a device, EMIA-110, manufactured by Horiba Seisakusho Co.

The oxygen concentration was found from the amount of CO gas generated by a high-temperature thermal decomposition method in a graphite crucible by pulverizing the aluminum nitride sintered body into a powder and by using a device, EMGA-2800, manufactured by Horiba Seisakusho Co.

Further, the concentrations of impurities in the aluminum nitride powder were measured in the same manner as the above-mentioned powder of the aluminum nitride sintered body.

(2) Specific Surface Area.

The specific surface area of the sintering additive was found by a BET method based on the $N_2$ adsorption by using the FlowSorb 2300 manufactured by Shimazu Seisakusho Co.

(3) Crystal Grain Size of the Sintered Body.

Found based on a cord method from a SEM photograph of the sectional surface of the sintered body at a magnification of 1500 times. Namely, a crossing point of a straight line arbitrarily drawn on the SEM photograph per a unit length and a grain boundary was found, the length of a cord thereof (distance between a grain boundary and a grain boundary) was found, and an average crystal grain size of the sintered body was found by the arithmetical mean.

(4) Light Transmission Factor.

The light transmission factor of the aluminum nitride sintered body was measured by using an instrument, HZ-1, manufactured by Suga Shikenki Co., by machining the aluminum nitride sintered body into a shape of a diameter of a diameter of 30 mm and a thickness of 0.3 mm.

(5) Spectrum.

The aluminum nitride was measured for its spectrum in a wavelength region of 240 to 800 nm by machining the aluminum nitride sintered body into a shape of a diameter of 30 mm, a thickness of 0.3 mm and an average surface roughness Ra (JIS B 0601) of not larger than 0.05 μm, and by using an instrument, UV-2100, manufactured by Shimazu Seisakusho Co. The inclination (rising property) of the wavelength region of 260 to 300 nm and the wavelength at which the light transmission factor reaches 60% were found from the spectral curve.

(6) Flexural Strength.

Measured relying upon a three-point flexural testing method in accordance with the JIS R 1601 at a crosshead speed of 0.5 mm/min. The test piece possessed a width of 4 mm, the sintered body was cut into a width of 6 mm, and both ends were ground by 1 mm to possess a predetermined width. The upper and lower surfaces were ground.

Example 1

Into a nylon pot having a volume of 2.4 liters were introduced nylon balls of a diameter of 15 mm obtained by coating iron cores with a nylon (surface hardness of not larger than 100 kgf/mm$^2$, density of 3.5 g/cm$^3$), 100 parts by weight of an aluminum nitride powder having an average particle size of 1.3 μm, a specific surface area of 3.39 m$^2$/g, an oxygen concentration of 0.8% by weight and a metal impurity concentration of 35 ppm, 3 parts by weight of yttrium oxide (purity of 99.9%) having a specific surface area as shown in Table 1 as a chief agent of the sintering additive, 0.3 parts by weight of calcium phosphate (purity of 98%, specific surface area of 47 m$^2$/g) as a sub-agent of the sintering agent, and 40 parts by weight of ethanol as a solvent, and were wet-mixed together. The nylon balls were introduced in an amount of 40% (apparent volume) of the volume of the pot. The mixing was effected by rotating the pot at a speed of 70 rpm for 3 hours. The slurry obtained by the wet-mixing was dried to obtain a mixed powder of an aluminum nitride powder and a sintering additive (main agent and sub-agent).

10 Grams of the mixed powder was temporarily molded by using a monoaxial molding machine into an article having a diameter of 40 mm and a thickness of 6 mm, and was, then, molded by using a CIP molding machine under a load of 3 t/cm$^2$.

The obtained molded article was fired (in a reducing atmosphere) by using a setter made of carbon in a nitrogen atmosphere at a temperature of 1780° C. for 50 hours to obtain an aluminum nitride sintered body having a diameter of 30 mm and a thickness of 3 mm. The conditions for producing the aluminum nitride sintered bodies are shown in Table 1, and properties of the obtained aluminum nitride sintered bodies are shown in Table 2. In Table 1, the firing in the reducing atmosphere is expressed as "firing A" and the firing in the neutralizing atmosphere is expressed as "firing B".

Example 2

A molded article was produced in the same manner as in Example 1 with the exception of using the yttrium oxide which is a main agent of the sintering additive in an amount of 1 part by weight and using the calcium phosphate which is the sub-agent of the sintering additive in an amount of 0.1 part by weight. The molded article was fired under the conditions shown in Table 1 to obtain an aluminum nitride sintered body. Table 2 shows the properties of the obtained aluminum nitride sintered body.

Example 3

A molded article was produced in the same manner as in Example 1 with the exception of not adding the calcium phosphate (sub-agent of the sintering additive). The molded article was fired under the conditions shown in Table 1 to obtain an aluminum nitride sintered body. Table 2 shows the properties of the obtained aluminum nitride sintered body.

Example 4

A molded article was produced in the same manner as in Example 2 with the exception of not adding the calcium phosphate (sub-agent of the sintering additive). The molded article was fired under the conditions shown in Table 1 to obtain an aluminum nitride sintered body. Table 2 shows the properties of the obtained aluminum nitride sintered body.

Example 5

A molded article was produced in the same manner as in Example 1 with the exception of adding 0.5 parts by weight of yttrium oxide having a specific surface area shown in Table 1 as a main agent of the sintering additive but without adding the calcium phosphate (sub-agent of the sintering additive). The molded article was fired under the conditions shown in Table 1 to obtain an aluminum nitride sintered body. Table 2 shows the properties of the obtained aluminum nitride sintered body.

Example 6

A molded article was produced in the same manner as in Example 1 with the exception of adding 3 parts by weight of yttrium carbonate having a specific surface area shown in Table 1 as a main agent of the sintering additive and adding 0.3 parts by weight of the calcium phosphate (same as that of Example 1) as the sub-agent. The molded article was fired under the conditions shown in Table 1 to obtain an aluminum nitride sintered body. Table 2 shows the properties of the obtained aluminum nitride sintered body.

Example 7

A molded article was produced in the same manner as in Example 1 with the exception of adding 1 part by weight of yttrium carbonate having a specific surface area shown in Table 1 as a main agent of the sintering additive but without adding the sub-agent. The molded article was fired under the conditions shown in Table 1 to obtain an aluminum nitride sintered body. Table 2 shows the properties of the obtained aluminum nitride sintered body.

Example 8

A molded article was produced in the same manner as in Example 1 with the exception of adding 3 parts by weight of yttrium carbonate having a specific surface area shown in Table 1 as a main agent of the sintering additive and adding 0.03 parts by weight of the calcium phosphate as the sub-agent. The molded article was fired under the conditions shown in Table 1 to obtain an aluminum nitride sintered body. Table 2 shows the properties of the obtained aluminum nitride sintered body.

Example 9

A molded article was produced in the same manner as in Example 1 with the exception of adding 3 parts by weight of yttrium carbonate having a specific surface area shown in Table 1 as a main agent of the sintering additive and adding 1.5 parts by weight of the calcium phosphate as the sub-agent. The molded article was fired under the conditions shown in Table 1 to obtain an aluminum nitride sintered body. Table 2 shows the properties of the obtained aluminum nitride sintered body.

Example 10

A molded article was produced in the same manner as in Example 1 with the exception of adding 3 parts by weight of calcium phosphate having a specific surface area shown in Table 1 as a main agent of the sintering additive and adding, as the sub-agent, 0.3 parts by weight of the yttrium oxide that was used in Example 1 as the main agent. The molded article was fired under the conditions shown in Table 1 to obtain an aluminum nitride sintered body. Table 2 shows the properties of the obtained aluminum nitride sintered body.

Comparative Example 1

A molded article was produced in the same manner as in Example 1 with the exception of adding 5 parts by weight of yttrium oxide having a specific surface area of 12 $m^2/g$ as a main agent of the sintering additive but without adding the sub-agent. The molded article was fired under the conditions shown in Table 1 to obtain an aluminum nitride sintered body. Table 2 shows the properties of the obtained aluminum nitride sintered body.

Comparative Example 2

A molded article was produced in the same manner as in Example 1 with the exception of adding 3 parts by weight of yttrium oxide having a specific surface area of 12 $m^2/g$ as a main agent of the sintering additive but without adding the sub-agent. The molded article was fired under the conditions shown in Table 1 to obtain an aluminum nitride sintered body. Table 2 shows the properties of the obtained aluminum nitride sintered body.

Comparative Example 3

A molded article was produced in the same manner as in Example 1 with the exception of adding 5 parts by weight of yttrium oxide having a specific surface area of 12 $m^2/g$ as a main agent of the sintering additive and adding 0.5 parts by weight of the calcium phosphate (same as the sub-agent of Example 1) as the sub-agent. The molded article was fired under the conditions shown in Table 1 to obtain an aluminum nitride sintered body. Table 2 shows the properties of the obtained aluminum nitride sintered body.

Comparative Example 4

An aluminum nitride sintered body was obtained in the same manner as in Comparative Example 3 but changing the firing conditions as shown in Table 1. Table 2 shows the properties of the obtained aluminum nitride sintered body.

Comparative Example 5

An aluminum nitride sintered body was obtained in the same manner as in Comparative Example 1 but changing the firing conditions as shown in Table 1. Table 2 shows the properties of the obtained aluminum nitride sintered body.

Comparative Example 6

A molded article was produced in the same manner as in Comparative Example 1 with the exception of adding 1 part by weight of yttrium oxide having a specific surface area of 12 $m^2/g$ as a main agent of the sintering additive but without adding the sub-agent. The molded article was fired under the conditions shown in Table 1 to obtain an aluminum nitride sintered body. Table 2 shows the properties of the obtained aluminum nitride sintered body.

Comparative Example 7

Into a nylon pot having a volume of 2.4 liters were introduced nylon balls of a diameter of 15 mm obtained by coating iron cores with a nylon (surface hardness of not larger than 100 $kgf/mm^2$, density of 3.5 $g/cm^3$), 100 parts by weight of an aluminum nitride powder having an average particle size of 1.3 μm, a specific surface area of 3.39 $m^2/g$ and an oxygen concentration of 0.8% by weight, 5 parts by weight of yttrium oxide having a specific surface area of 12 $m^2/g$ as a sintering additive (main agent), and 40 parts by weight of ethanol as a solvent, and were wet-mixed together. The nylon balls were introduced in an amount of 40% (apparent volume) of the volume of the pot. The mixing was effected by rotating the pot at a speed of 70 rpm for 3 hours. The slurry obtained by the wet-mixing was dried to obtain a mixed powder of an aluminum nitride powder and a sintering additive (main agent).

10 Grams of the obtained aluminum nitride powder was temporarily molded by using a monoaxial molding machine into an article having a diameter of 40 mm and a thickness of 6 mm, and was, then, molded by using a CIP molding machine under a load of 3 $t/cm^2$.

The obtained molded article was fired (in a neutralizing atmosphere) by using a setter made of aluminum nitride in a nitrogen atmosphere at a temperature of 1750° C. for 5 hours to obtain an aluminum nitride sintered body having a diameter of 30 mm and a thickness of 3 mm. The conditions for producing the aluminum nitride sintered bodies are shown in Table 1, and properties of the obtained aluminum nitride sintered bodies are shown in Table 2.

Comparative Example 8

The sintered body obtained in Comparative Example 7 was heat-treated in a nitrogen atmosphere at a firing temperature of 1730° C. for a firing time of 150 hours. Table 2 shows the properties of the heat-treated molded article.

Comparative Example 9

A molded article was produced in the same manner as in Comparative Example 7 with the exception of adding 2 parts by weight of the yttrium oxide powder as a main agent of the sintering additive. The molded article was fired under the conditions shown in Table 1 in a reducing atmosphere to obtain an aluminum nitride sintered body. Table 2 shows the properties of the obtained sintered body.

Comparative Example 10

An aluminum nitride sintered body was obtained in the same manner as in Comparative Example 9 but changing the firing in the reducing atmosphere as shown in Table 1. Table 2 shows the properties of the sintered body.

Comparative Example 11

An aluminum nitride sintered body was obtained in the same manner as in Comparative Example 7 but changing the firing in the reducing atmosphere as shown in Table 1. Table 2 shows the properties of the sintered body.

In the Comparative examples 9 to 11, the reducing atmosphere is formed by a setter made of carbon. Besides, the sintered bodies of Comparative Examples 9 to 11 were so brittle that they could not be measured for their flexural strengths and spectra.

TABLE 1

| | Sintering additves (main agent) | | | Sintering additives (sub agent) | | Firing condition | | | |
|---|---|---|---|---|---|---|---|---|---|
| | | | | | | Firing A | Firing A | Firing B | Firing B |
| | Kind | Amount Parts | Specific Surface Area $m^2/g$ | Kind | Amount Parts | temp. ° C. | time hr | temp. ° C. | time hr |
| Ex. 1 | Y2O3 | 3 | 35 | Calcium phosphate | 0.3 | 1780 | 50 | 1780 | 50 |
| Ex. 2 | Y2O3 | 1 | 35 | Calcium phosphate | 0.1 | 1780 | 50 | 1780 | 50 |
| Ex. 3 | Y2O3 | 3 | 35 | — | — | 1780 | 50 | 1780 | 50 |
| Ex. 4 | Y2O3 | 1 | 35 | — | — | 1780 | 50 | 1780 | 50 |
| Ex. 5 | Y2O3 | 0.5 | 35 | — | — | 1780 | 50 | 1780 | 50 |
| Ex. 6 | Yttrium carbonate | 3 | 30 | Calcium phosphate | 0.3 | 1780 | 50 | 1780 | 50 |
| Ex. 7 | Yttrium carbonate | 1 | 30 | — | — | 1780 | 50 | 1780 | 50 |
| Ex. 8 | Yttrium carbonate | 3 | 30 | Calcium phosphate | 0.03 | 1780 | 50 | 1780 | 50 |

TABLE 1-continued

| | Sintering additves (main agent) | | | Sintering additves (sub agent) | | Firing condition | | | |
|---|---|---|---|---|---|---|---|---|---|
| | Kind | Amount Parts | Specific Surface Area m²/g | Kind | Amount Parts | Firing A temp. °C. | Firing A time hr | Firing B temp. °C. | Firing B time hr |
| Ex. 9 | Yttrium carbonate | 3 | 30 | Calcium phosphate | 1.5 | 1780 | 50 | 1780 | 50 |
| Ex. 10 | Calcium phosphate | 3 | 47 | Y2O3 | 0.3 | 1780 | 50 | 1780 | 50 |
| Com-Ex. 1 | Y2O3 | 5 | 12 | — | — | 1780 | 50 | 1780 | 50 |
| Com-Ex. 2 | Y2O3 | 3 | 12 | — | — | 1780 | 50 | 1780 | 50 |
| Com-Ex. 3 | Y2O3 | 5 | 12 | Calcium phosphate | 0.5 | 1780 | 50 | 1780 | 50 |
| Com-Ex. 4 | Y2O3 | 5 | 12 | Calcium phosphate | 0.5 | 1750 | 50 | 1750 | 50 |
| Com-Ex. 5 | Y2O3 | 5 | 12 | Calcium phosphate | 0.5 | 1730 | 50 | 1730 | 50 |
| Com-Ex. 6 | Y2O3 | 1 | 12 | — | — | 1780 | 50 | 1780 | 50 |
| Com-Ex. 7 | Y2O3 | 5 | 12 | — | — | — | — | 1750 | 5 |
| Com-Ex. 8 | Y2O3 | 5 | 12 | — | — | — | — | 1750 | 5 |
| Com-Ex. 9 | Y2O3 | 2 | 12 | — | — | 1700 | 4 | — | — |
| Com-Ex. 10 | Y2O3 | 2 | 12 | — | — | 2100 | 4 | — | — |
| Com-Ex. 11 | Y2O3 | 5 | 12 | — | — | 1900 | 400 | — | — |

*In Comparative Example 8, the heat treatment was conducted at 1730° C. for 150 hours after the firing B.

TABLE 2

| | Total Transmission Factor % | Wavelength Reaching 60% nm | Rising Prop. %/nm | Flexnral strength MPa | Properties of sintered body | | | | | Particle structure |
|---|---|---|---|---|---|---|---|---|---|---|
| | | | | | Impurity concentration | | | | | Particle size μm |
| | | | | | Y concentration ppm | Metal ion concentration ppm | Total concentration ppm | Carbon Concentration ppm | Oxygen Concentration ppm | |
| Ex. 1 | 86.8 | 312.0 | 1.35 | 380 | 40 | 23 | 63 | 170 | 300 | 8 |
| Ex. 2 | 87.0 | 310.0 | 1.38 | 350 | 40 | 24 | 64 | 150 | 200 | 9 |
| Ex. 3 | 86.0 | 390.0 | 1.10 | 350 | 100 | 40 | 140 | 200 | 300 | 8 |
| Ex. 4 | 86.1 | 380.0 | 1.05 | 360 | 100 | 35 | 135 | 200 | 350 | 9 |
| Ex. 5 | 86.2 | 360.0 | 1.10 | 350 | 100 | 40 | 140 | 200 | 400 | 10 |
| Ex. 6 | 86.9 | 310.0 | 1.39 | 350 | 45 | 33 | 78 | 150 | 250 | 8 |
| Ex. 7 | 86.2 | 350.0 | 1.15 | 350 | 100 | 35 | 135 | 200 | 350 | 9 |
| Ex. 8 | 86.5 | 320.0 | 1.38 | 350 | 45 | 38 | 83 | 190 | 300 | 8 |
| Ex. 9 | 86.6 | 320.0 | 1.39 | 380 | 45 | 35 | 80 | 180 | 300 | 8 |
| Ex. 10 | 86.7 | 315.0 | 1.35 | 360 | 40 | 40 | 80 | 170 | 300 | 8 |
| Com-Ex. 1 | 64.0 | — | 0.50 | 360 | 22000 | 147 | 22147 | 200 | 9000 | 8 |
| Com-Ex. 2 | 68.0 | — | 0.55 | 350 | 10000 | 167 | 10167 | 200 | 7000 | 9 |
| Com-Ex. 3 | 81.0 | 408.0 | 0.85 | 340 | 200 | 90 | 290 | 200 | 800 | 10 |
| Com-Ex. 4 | 75.0 | 430.0 | 0.85 | 350 | 2040 | 120 | 2160 | 200 | 1000 | 8 |
| Com-Ex. 5 | 70.0 | 450.0 | 0.80 | 350 | 12400 | 179 | 12579 | 200 | 5000 | 6 |
| Com-Ex. 6 | 80.0 | 410.0 | 0.85 | 340 | 200 | 100 | 300 | 200 | 900 | 10 |
| Com-Ex. 7 | 48.2 | — | 0.20 | 360 | 34000 | 228 | 34228 | 200 | 17300 | 5 |
| Com-Ex. 8 | 57.2 | — | 0.35 | 355 | 33000 | 120 | 33120 | 200 | 17100 | 12 |
| Com-Ex. 9 | 60.0 | — | — | — | 900 | 110 | 1010 | 300 | 3000 | 7 |
| Com-Ex. 10 | 75.0 | — | — | — | 800 | 100 | 900 | 300 | 2000 | 15 |
| Com-Ex. 11 | 84.0 | — | — | — | 50 | 200 | 250 | 250 | 300 | 25 |

The invention claimed is:

1. An aluminum nitride sintered body having an oxygen concentration of not larger than 400 ppm, a metal impurity concentration of not larger than 150 ppm, and a carbon concentration of not larger than 200 ppm, and having an average crystal grain size of 2 μm to 20 μm.

2. An aluminum nitride sintered body according to claim 1, wherein an inclination of a spectral curve in the wavelength region of 260 to 300 nm is not smaller than 1.0 (%/nm), a light transmission factor is not smaller than 86% in the wavelength region of 400 to 800 nm, and a wavelength is not longer than 400 nm when the light transmission factor reaches 60% in the spectrum.

3. An aluminum nitride sintered body according to claim 1, wherein a flexural strength is not smaller than 300 MPa.

* * * * *